(12) United States Patent
Miyata

(10) Patent No.: US 8,996,390 B2
(45) Date of Patent: Mar. 31, 2015

(54) COMPUTER READABLE MEDIUM, OPERATION CONTROLLING METHOD, AND OPERATION CONTROL SYSTEM

(75) Inventor: Takashi Miyata, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1248 days.

(21) Appl. No.: 12/372,253

(22) Filed: Feb. 17, 2009

(65) Prior Publication Data

US 2010/0042819 A1    Feb. 18, 2010

(30) Foreign Application Priority Data

Aug. 14, 2008    (JP) .................................. 2008-208915

(51) Int. Cl.
G06Q 30/02    (2012.01)
G06Q 10/10    (2012.01)
G06Q 10/06    (2012.01)
G06Q 30/06    (2012.01)
G06Q 10/08    (2012.01)

(52) U.S. Cl.
CPC ...................................... *G06Q 10/06* (2013.01)
USPC .......................................................... 705/1.1

(58) Field of Classification Search
USPC .................................................. 705/1.1–912
See application file for complete search history.

(56) References Cited

FOREIGN PATENT DOCUMENTS

| JP | A-9-138824 | 5/1997 |
|---|---|---|
| JP | A-2002-342542 | 11/2002 |
| JP | A-2008-27056 | 2/2008 |
| JP | A-2008-146304 | 6/2008 |

OTHER PUBLICATIONS

Mar. 16, 2010 Office Action issued in Japanese Patent Application No. 2008-208915 (with translation).

*Primary Examiner* — Jonathan Ouellette
(74) *Attorney, Agent, or Firm* — Oliff PLC

(57) ABSTRACT

A computer readable medium storing a program causing a computer to execute a process for controlling a plurality of operations, the process including: accepting a change request to change an operation result of an operation executed prior to a current execution-permitted operation which an execution is permitted based on an operation procedure for the operations; assuming an operation for which the change request is accepted in the accepting step as a starting point; and identifying an operation permitted to be executed with reference to the starting point based on the operation procedure.

7 Claims, 19 Drawing Sheets

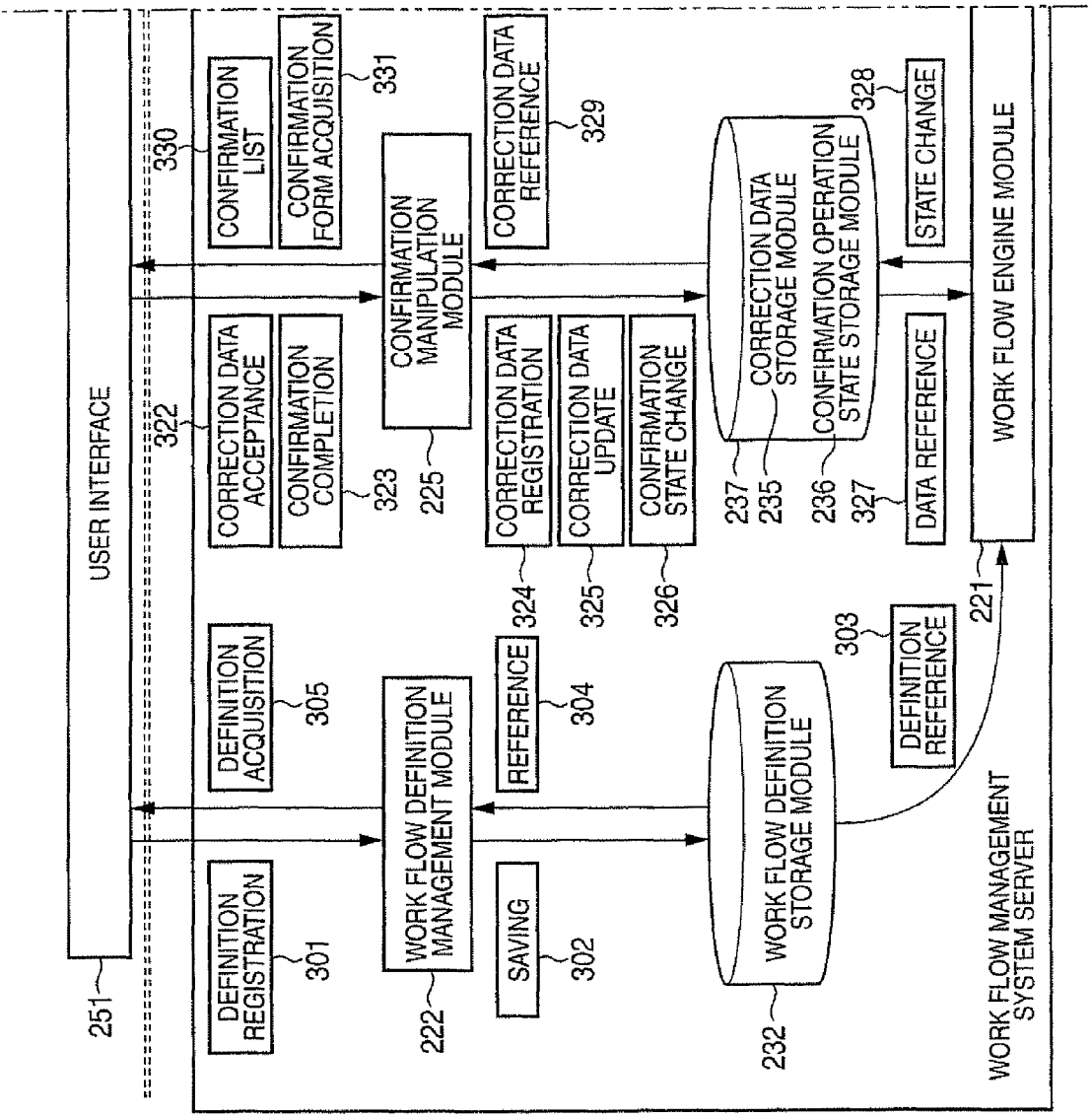
(FIG. 3 Continued)

FIG. 6A

WORK FLOW: PURCHASE WORK FLOW — 600

- 611 APPLICANT: TARO SUZUKI
- 612 DEPARTMENT: SYSTEM DEVELOPMENT DEPARTMENT
- 613 PURCHASE NAME: PRINTxxxxx (PRINTER)
- 614 UNIT PRICE: ¥250,000
- 615 QUANTITY: 1
- 616 PROCUREMENT SOURCE: INTERNATIONAL OFFICE EQUIPMENT
- 617 ACCOUNT NUMBER: 595-123xxx
- 618 BUDGET CATEGORY: FACILITY
- 619 DESIRED DELIVERY TIME: 2006/10/10

[APPROVAL REQUEST] — 621

FIG. 6B

WORK FLOW: PURCHASE WORK FLOW — 600

- 611 APPLICANT: TARO SUZUKI
- 612 DEPARTMENT: SYSTEM DEVELOPMENT DEPARTMENT
- 613 PURCHASE NAME: PRINTxxxxx (PRINTER)
- 614 UNIT PRICE: ¥250,000
- 615 QUANTITY: 1
- 616 PROCUREMENT SOURCE: INTERNATIONAL OFFICE EQUIPMENT
- 617 ACCOUNT NUMBER: 595-123xxx
- 618 BUDGET CATEGORY: FACILITY
- 619 DESIRED DELIVERY TIME: 2007/10/10

[CORRECTION CONFIRMATION REQUEST] — 631

WORK FLOW: PURCHASE WORK FLOW

- 711 — APPLICANT: TARO SUZUKI
- 712 — DEPARTMENT: SYSTEM DEVELOPMENT DEPARTMENT
- 713 — PURCHASE NAME: PRINTxxxxx (PRINTER)
- 714 — UNIT PRICE: ¥250,000 → ¥262,500
- 715 — QUANTITY: 1

DETAILS OF APPLICATION HAVE BEEN CORRECTED BY MR. SUZUKI

[CONFIRM] 721   [REJECT] 722

WORK FLOW: PURCHASE WORK FLOW

- 811 — UNIT PRICE: ¥250,000 → ¥262,500

DETAILS OF APPLICATION HAVE BEEN REJECTED BY MR. A.

- 812 — ● CORRECTION WITHDRAWAL (CONTINUE WITH THE UNCORRECTED DETAILS)
- 813 — ○ APPLICATION WITHDRAWAL (DISCONTINUE THE ITEM)

[EXECUTE] 821

FIG. 9

| ID (901) | DEFINITION NAME (902) |
|---|---|
| 1 | APPLICATION FOR PURCHASE |
| 2 | REIMBURSEMENT OF TRAVELING EXPENSES |
| ... | ... |

| ID (1001) | DEFINITION (1002) | OPERATION NAME (1003) |
|---|---|---|
| 111 | 1 | APPLICATION |
| 112 | 1 | APPROVAL BY SECTION MANAGER |
| 113 | 1 | APPROVAL BY DEPARTMENT MANAGER |
| 114 | 1 | PROCUREMENT |
| 115 | 1 | ACCOUNTING |
| 116 | 1 | GENERAL AFFAIRS |
| 117 | 2 | APPLICATION |
| 118 | 2 | APPROVAL BY SECTION MANAGER |
| 119 | 2 | ACCOUNTING |
| ... | ... | ... |

| ID | TRANSITION SOURCE | TRANSITION DESTINATION |
|---|---|---|
| 311 | 111 | 112 |
| 312 | 112 | 113 |
| 313 | 113 | 114 |
| 314 | 113 | 115 |
| 315 | 114 | 116 |
| 316 | 115 | 116 |
| 317 | 117 | 118 |
| 318 | 118 | 119 |
| ... | ... | ... |

FIG. 12

| ID | DEFINITION | ATTRIBUTE NAME | DATA TYPE |
|---|---|---|---|
| 511 | 1 | APPLICANT | STRING TYPE |
| 512 | 1 | DEPARTMENT | STRING TYPE |
| 513 | 1 | PURCHASE NAME | STRING TYPE |
| 514 | 1 | UNIT PRICE | INTEGER TYPE |
| 515 | 1 | QUANTITY | INTEGER TYPE |
| 516 | 1 | PROCUREMENT SOURCE | STRING TYPE |
| 517 | 1 | ACCOUNT NUMBER | STRING TYPE |
| 518 | 1 | BUDGET CATEGORY | STRING TYPE |
| 519 | 1 | DESIRED DELIVERY TIME | DATE TYPE |
| 520 | 2 | DATE | DATE TYPE |
| 521 | 2 | DESTINATION | STRING TYPE |
| 522 | 2 | TRAVELING EXPENSES | APPLICANT |
| ... | ... | ... | ... |

FIG. 17

| ID | ITEM | ATTRIBUTE DEFINITION | ATTRIBUTE VALUE |
|---|---|---|---|
| 1131 | 1001 | 511 | TARO SUZUKI |
| 1132 | 1001 | 512 | SYSTEM DEVELOPMENT DEPARTMENT |
| 1133 | 1001 | 513 | Printerxxxxx (PRINTER) |
| 1134 | 1001 | 514 | 250000 |
| 1135 | 1001 | 515 | 1 |
| 1136 | 1001 | 516 | INTERNATIONAL OFFICE EQUIPMENT |
| 1137 | 1001 | 517 | 595-123xxx |
| 1138 | 1001 | 518 | FACILITY |
| 1139 | 1001 | 519 | 2006/10/10 |
| 1140 | 1002 | 520 | 2007/09/15 |
| 1141 | 1002 | 521 | OTEMACHI |
| 1142 | 1002 | 522 | 370 |
| ... | ... | ... | ... |

FIG. 19

| ID (1901) | ITEM (1902) | OPERATION DEFINITION (1903) | STATE (1904) |
|---|---|---|---|
| 8101 | 1001 | 111 | COMPLETE |
| 8102 | 1001 | 112 | UNDER EXECUTION |
| 8103 | 1001 | 113 | STANDBY |
| 8104 | 1001 | 114 | STANDBY |
| 8105 | 1001 | 115 | STANDBY |
| 8106 | 1001 | 116 | STANDBY |
| ... | ... | ... | ... |

| ID (2001) | ITEM (2002) | ATTRIBUTE DEFINITION (2003) | ATTRIBUTE VALUE (2004) |
|---|---|---|---|
| 9134 | 1001 | 514 | 262500 |
| 9137 | 1001 | 517 | 565-123xxx |
| 9139 | 1001 | 519 | 2007/10/10 |
| ... | ... | ... | ... |

| ID | ITEM | OPERATION DEFINITION | STATE |
|---|---|---|---|
| 10101 | 1005 | 111 | APPROVED |
| 10102 | 1005 | 112 | UNDER EXECUTION |
| ... | ... | ... | ... |

| ID | ITEM | OPERATION DEFINITION | STATE | EXECUTION TYPE |
|---|---|---|---|---|
| 11101 | 1005 | 111 | COMPLETE | OPERATION EXECUTION |
| 11102 | 1005 | 112 | UNDER EXECUTION | CONFIRMATION |
| 11103 | 1005 | 113 | STANDBY | APPLICATION CANCELLATION |
| 11104 | 1005 | 114 | STANDBY | APPLICATION CANCELLATION |
| ... | ... | ... | ... | ... |

2301, 2302, 2303, 2304, 2305 → 2300

COMPUTER READABLE MEDIUM, OPERATION CONTROLLING METHOD, AND OPERATION CONTROL SYSTEM

CROSS-REFERENCE TO RELATED APPLICATIONS

This application is based on and claims priority under 35 U.S.C. 119 from Japanese Patent Application No. 2008-208915 filed Aug. 14, 2008.

BACKGROUND

1. Technical Field

The present invention relates to a computer readable medium, an operation controlling method, and an operation control system.

2. Related Art

There is a workflow system that defines the order of operations and exchange of information to carry out an application process having a plurality of operations and manages the states of operations and assignment of persons in charge to control execution based on the definition. There may be a case where modifications must be made to the already complete details in the workflow system.

SUMMARY

According to an aspect of the present invention, a computer readable medium storing a program causing a computer to execute a process for controlling a plurality of operations, the process including: accepting a change request to change an operation result of an operation executed prior to a current execution-permitted operation which an execution is permitted based on an operation procedure for the operations; assuming an operation for which the change request is accepted in the accepting step as a starting point; and identifying an operation permitted to be executed with reference to the starting point based on the operation procedure.

BRIEF DESCRIPTION OF THE DRAWINGS

Exemplary embodiment of the present invention will be described in detail based on the following figures, wherein:

FIGS. 6A and 6B are explanatory drawings of a screen example of application and correction of details;

FIG. 7 is an explanatory drawing of a confirmation screen example;

FIG. 8 is an explanatory drawing of a selection screen example for the corrector upon rejection;

FIG. 9 is an explanatory drawing of a data structure example of the workflow definition table;

FIG. 10 is an explanatory drawing of a data structure example of the operation definition table;

FIG. 11 is an explanatory drawing of a data structure example of the transition definition table;

FIG. 12 is an explanatory drawing of a data structure example of the attribute definition table;

FIG. 17 is an explanatory drawing of a data structure example of the attribute data table;

FIG. 19 is an explanatory drawing of a data structure example of the confirmation state table;

FIG. 20 is an explanatory drawing of a data structure example of the correction data table;

FIG. 22 is an explanatory drawing of a data structure example of the application cancellation state table;

FIG. 23 is an explanatory drawing of a data structure example of the execution type table.

DETAILED DESCRIPTION

An exemplary embodiment preferable in implementing the invention will be described based on drawings.

Figure 1:
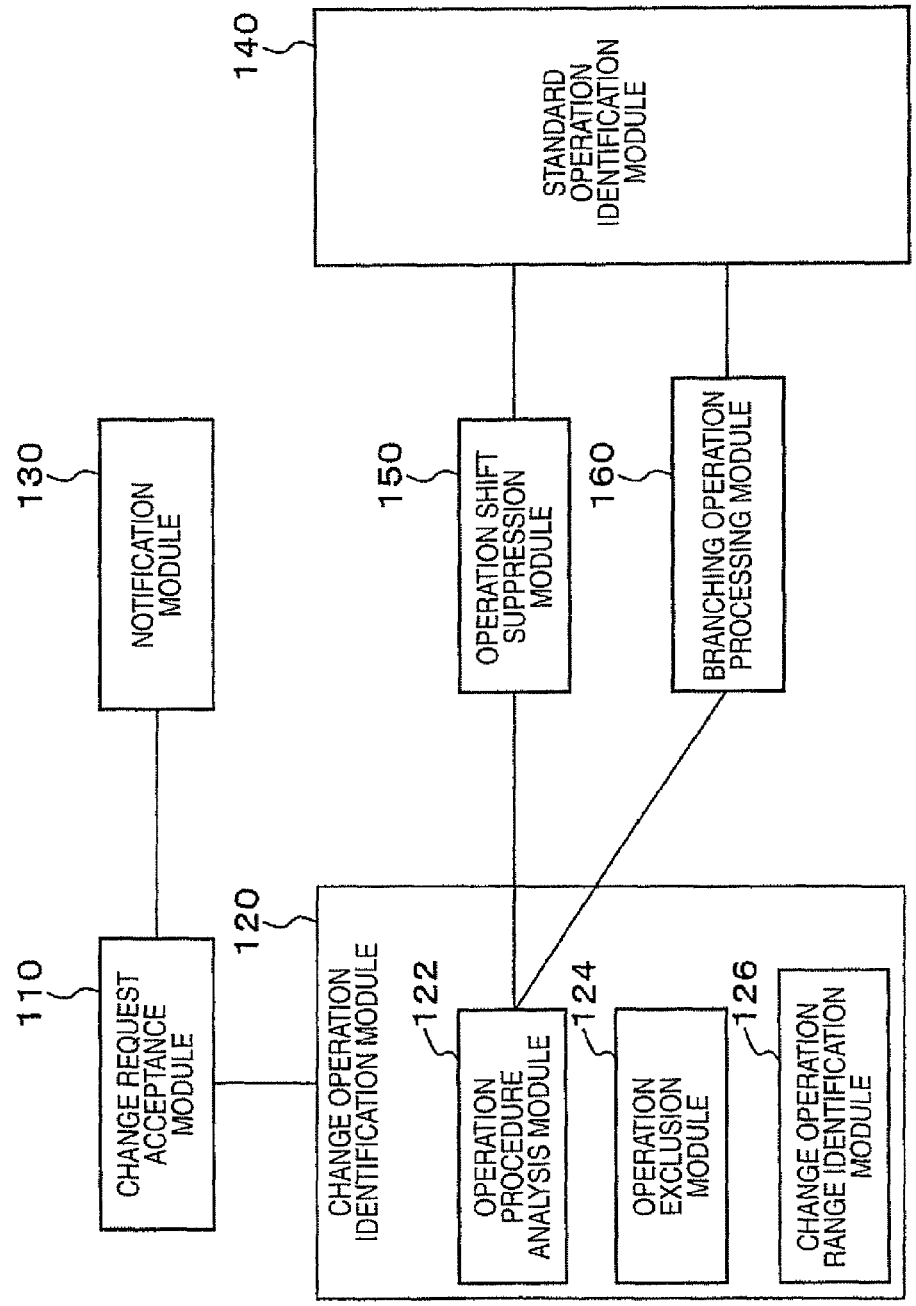
FIG. 1 is a conceptual module configuration diagram of a configuration example according to this embodiment.

FIG. 1 is a conceptual module configuration diagram of a configuration example according to this embodiment.

A module generally refers to a logically separable component such as software (a computer program) or hardware. A module in this embodiment refers to a module in a computer program as well as a module in a hardware configuration. Thus, this embodiment describes a computer program, a computer program and a method. For the purpose of explanation, terms such as "to store", "to cause to store" and their equivalents are used although these terms refer to storing something into a storage or making control so as to store something into a storage in case the embodiment in question is a computer program. While modules correspond to functions on a one-to-one basis, a single module may be composed of a single program or a plurality of modules may be composed of a single program, or a single module may be composed of a plurality of programs in actual implementation. A plurality of modules may be executed by a single computer. A single module may be executed by a plurality of computers in a distributed or parallel environment. A single module may include another module. Hereinafter the term "connection" is used for physical connection as well as logical connection such as data transmission/reception, instruction and reference between data items.

A system or a device includes a plurality of software or hardware components or devices interconnected by way of communication means such as a network (including an one-to-one communication connection) or a single computer or a single hardware component or a single device. A "device" and a "system" are terms synonymous with each other. The term "predetermined" refers to "prior to target processing" and includes a case prior to start of processing by this embodiment and a case determined by the then situation or state or the situation or state so far even after the processing by this embodiment started.

As shown in FIG. 1, this embodiment includes a change request acceptance module 110, a change operation identification module 120, a notification module 130, a standard operation identification module 140, an operation shift suppression module 150, and a branching operation processing module 160.

The workflow is a generic name for information related to application and a flow of operation and refers to an operation procedure for a plurality of operations. The work procedure includes a plurality of predetermined operation items, which includes operations. In particular, in a workflow engine module 221 illustrated in FIG. 2, the workflow includes identification of an operation permitted to be executed based on the operation procedure for the a plurality of operation items, performing the operation, performing the operation in accordance with the manipulation of the worker, and controlling those. The workflow may be a combination of modules of groupware, schedule management and progress management. An operation item is equivalent to an activity in a workflow. An operation is equivalent to an actual operation made per activity.

This embodiment processes a change to the operation result in a workflow. Such a change includes corrections, which will be a major topic in the following description.

The change request acceptance module 110 is connected to the change operation identification module 120 and the notification module 130.

The change request acceptance module 110 accepts a request to change the operation result of an operation executed before a current execution-permitted operation based on an operation procedure for a plurality of operations. In particular, in an exemplary case, a person who filed an application for purchase finds the error in the total amount and corrects the amount. When the change request is made as the correction, a separate later operation is under way.

The change operation identification module 120 is connected to the change request acceptance module 110 and includes an operation procedure analysis module 122, an operation exclusion module 124, and a change operation range identification module 126. The operation procedure analysis module 122 in the change operation identification module 120 is connected to an operation shift suppression module 150 and a branching operation processing module 160.

The operation procedure analysis module 122 analyzes a workflow in accordance with the analysis instructions from the change operation identification module 120, operation exclusion module 124, change operation range identification module 126, operation shift suppression module 150, and branching operation processing module 160 and passes the analysis result. For example, the operation procedure analysis module 122 extracts the order between operations connected in a network, presence/absence of branches and the branching section.

The change operation identification module 120 identifies an operation permitted to be executed based on the operation procedure assuming as a start point the operation for which a change request was accepted by the change request acceptance module 110 based on the analysis result of the operation procedure analysis module 122. That is, an operation between the operation for which a change request was made and the current operation is identified as an operation permitted to be executed. In the identified operation, the change to the operation for which a change request was made is permitted or rejected by the manipulation of the worker.

The "current execution-permitted operation" refers to an operation currently allocated to the worker in accordance with the workflow. An operation identified by the change operation identification module 120 and currently allocated to the worker may be included. That is, the current execution-permitted operation mainly includes a change operation and a current operation under way (for example, an operation on the application for purchase before correction) as well as an operation identified by the change operation identification module 120. This is to support a case where a further change is made during some change.

The "current execution-permitted operation" may have the condition that acceptance of completion of the operation is permitted on top of the condition that execution of the operation is permitted. That is, the current execution-permitted operation may be defined as an operation having not only the condition that its execution is permitted but also the condition that the operation is complete. In this case, an execution-permitted operation under way is not included.

The change operation identification module 120 may cause the operation exclusion module 124 to perform its processing in identification of an operation and identify an operation by using the result of the processing. That is, the operation exclusion module 124 excludes an operation independent of a change to the operation result based on the result of analysis by the operation procedure analysis module 122. "An operation independent of a change to the operation result" refers to an operation that has no relation to a change to the operation result, for example, an operation free from the influence (such as control or linkage) by the operation result. That is, only an operation subjected to the influence by a change to the operation result is identified.

The change operation identification module 120 may cause the change operation range identification module 126 to perform its processing and identify the endpoint of an operation by using the result of the processing. That is, in case the operation to be identified as an operation permitted to be executed is a current execution-permitted operation, or in case the operation to be identified as an operation permitted to be executed is an operation later than the current execution-permitted operation, the change operation range identification module 126 assumes the current execution-permitted operation as an endpoint. The expression "in case the operation to be identified as an operation permitted to be executed is an operation later than the current execution-permitted operation" serves to prevent a situation where the current operation under way is excluded as a result of processing by the operation exclusion module 124 and an operation later than the current operation under way is identified.

The notification module 130 is connected to the change request acceptance module 110. In case the change request acceptance module 110 has accepted a change request, the worker of the current execution-permitted operation is notified as such. This notifies the worker of the current operation under way that a change has been made to the target data. The notification may include, on top of the acceptance of a change request by the change request acceptance module 110, suppression made by the operation shift suppression module 150.

The standard operation identification module 140 is connected to the operation shift suppression module 150 and branching operation processing module 160.

The standard operation identification module 140 identifies an operation currently under way in the workflow in accordance with the operation procedure. In general, the standard operation identification module 140 identifies an operation currently under way in the absence of a change operation. The standard operation identification module 140 identifies an operation to be executed even in case a change operation is under way. Note that an operation shift may be suppressed by the operation shift suppression module 150. For example, the current operation under way may be discontinued to suppress identification of an operation.

The operation shift suppression module 150 is connected to the operation procedure analysis module 122 and standard operation identification module 140.

In case there is a second operation identified by the change operation identification module 120 among the operations executed before a first execution-permitted operation, the operation shift suppression module 150 suppresses a shift from the first operation to the next operation. That is, a change has occurred in an operation executed before the current operation under way, which may render useless the continuation of further operation. The operation shift suppression module 150 thus suppresses the current operation and the subsequent operations by way of discontinuation, suspension or postponement of an operation.

The branching operation processing module 160 is connected to the operation procedure analysis module 122 and standard operation identification module 140.

In case the operation procedure has branches and the operation identified by the change operation identification module 120 is in a different branch from that of the already executed operation, the branching operation processing module 160 cancels the already executed operation. In case a branch occurs in the workflow and the current operation under way is after the branch section and a different operation must be executed depending on the branching conditions due to a change-requested operation, the operations so far from the branch section are canceled.

Figure 2:
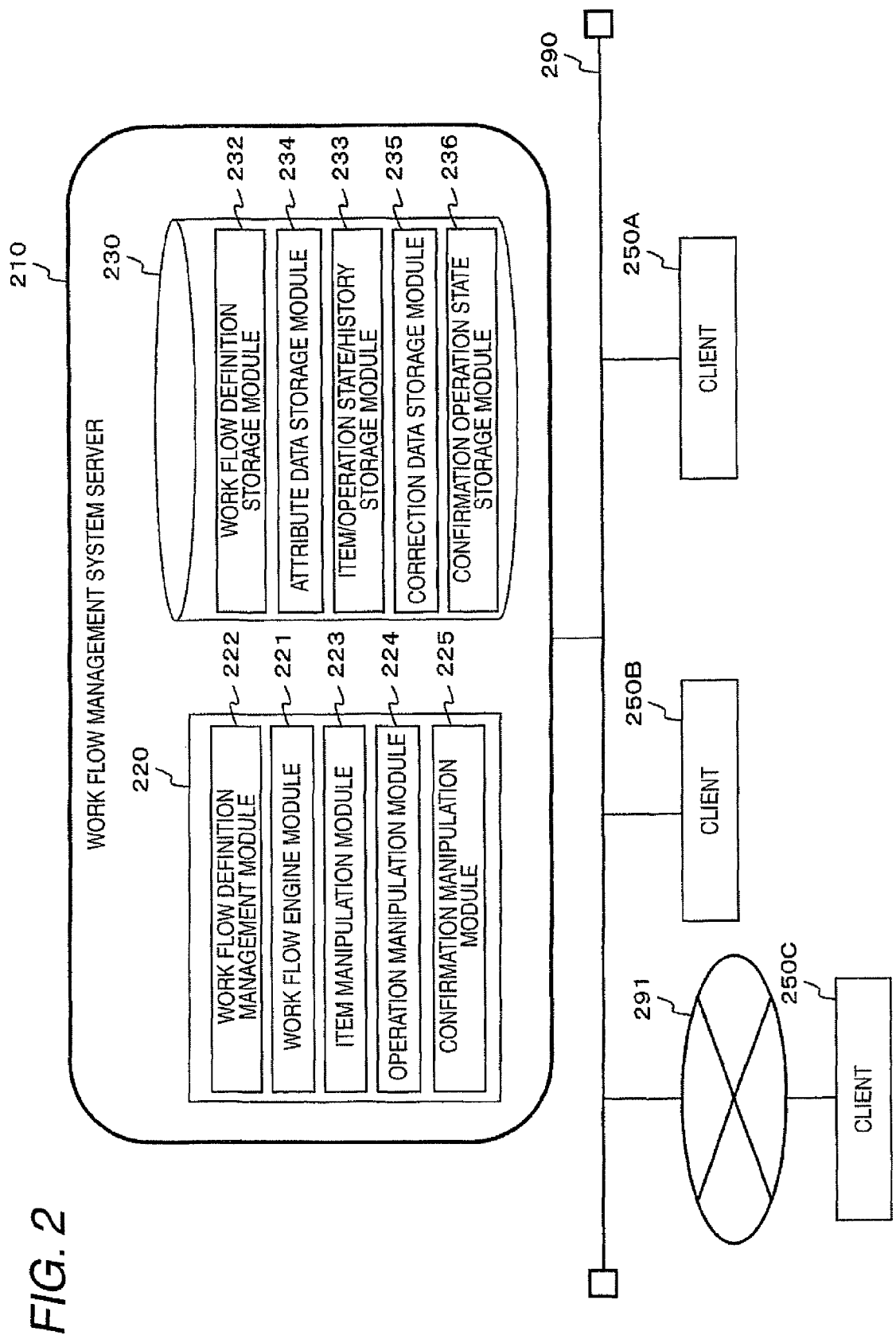
FIG. 2 is a block diagram of a configuration example of the entire system.

FIG. 2 is a block diagram of a configuration example of the entire system.

A workflow management system server 210 is connected to a client 250R and a client 250B via a network 290. The workflow management system server 210 is connected to a client 250C via a wide area communication network 291 and the network 290. The number of clients is not limited to three. A single client or more than three clients may be provided. One or more clients may be connected to the workflow management system server 210 via another communication network. More than one workflow management system server 210 may be provided. The workflow management system server 210 may be composed of a plurality of servers.

The workflow management system server 210 includes a workflow processing module 220 and a workflow data storage module 230.

The workflow processing module 220 includes a workflow engine module 221, a workflow definition management module 222, an item manipulation module 223, an operation manipulation module 224, and a confirmation manipulation module 225.

The workflow data storage module 230 includes a workflow definition storage module 232, an item/operation state/history storage module 233, an attribute data storage module 234, a correction data storage module 235, and a confirmation operation state storage module 236.

The worker uses the workflow management system server 210 via the user interfaces of the clients 250A, 250B and 250C.

In the workflow management system server 210, each module in the workflow processing module 220 performs processing related to a workflow by using the data stored in the workflow data storage module 230. The workflow management system server 210 mainly causes the confirmation manipulation module 225 to perform processing shown in FIG. 1 by using the correction data storage module 235 and confirmation operation state storage module 236. The workflow management system server 210 causes the workflow definition management module 222 to define the workflow by using the workflow definition storage module 232. The workflow management system server 210 causes the item manipulation module 223 to activate the workflow of a particular item by using the item/operation state/history storage module 233. The workflow management system server 210 causes the operation manipulation module 224 to execute an operation by using the attribute data storage module 234 or item/operation state/history storage module 233 in accordance with the manipulation of the worker. The workflow engine module 221 is in charge of the basic processing related to a workflow, that is, control of the workflow of an item or operation executing state. An item refers to a workflow actually activated in accordance with a defined workflow. Workflows as a plurality of items may be activated from the definition of a single workflow.

Figure 3:
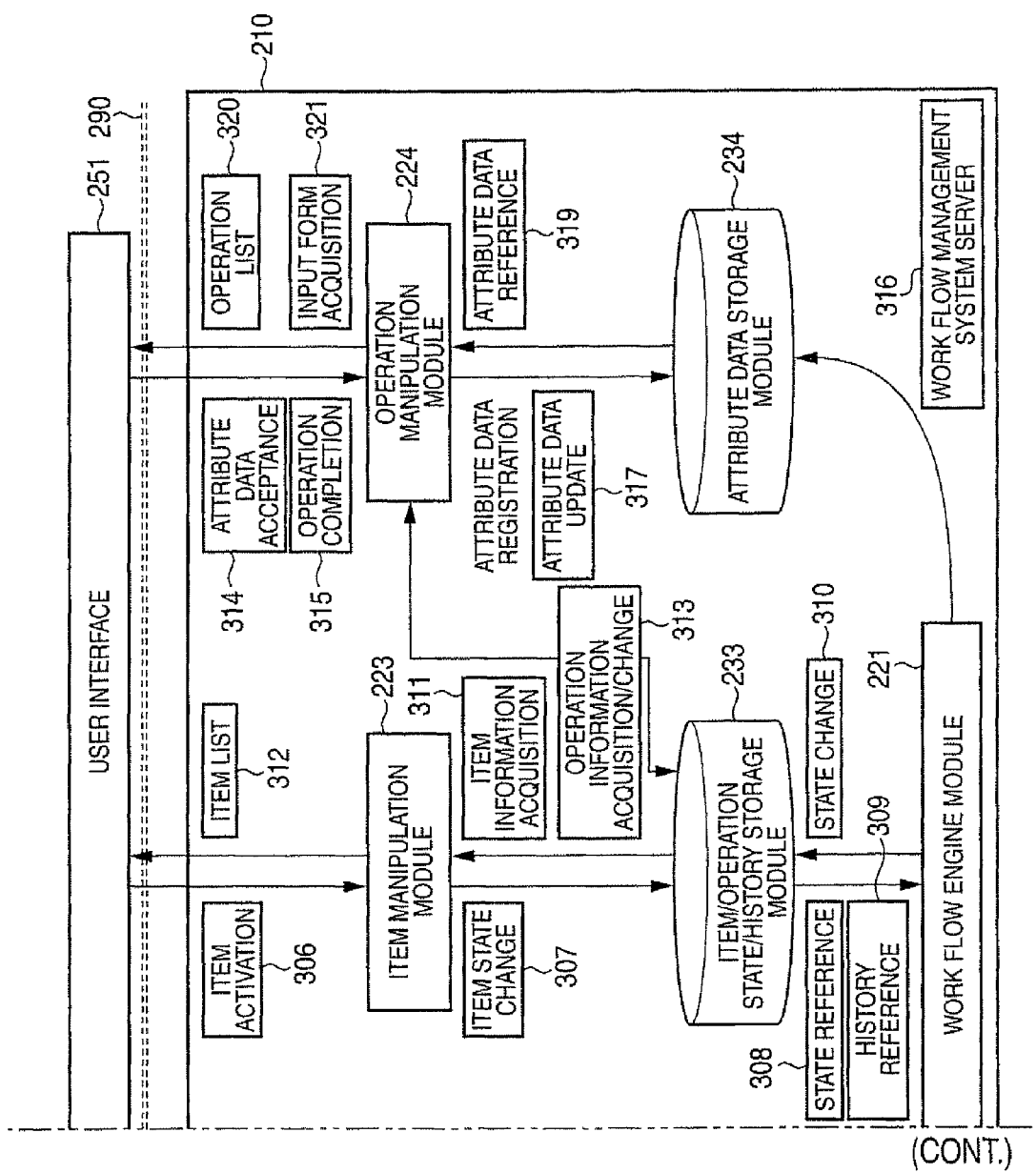
FIG. 3 is a conceptual module configuration diagram of the configuration example of this embodiment as observed from a different viewpoint.

FIG. 3 is a conceptual module configuration diagram of the configuration example of this embodiment as observed from a different viewpoint. FIG. 3 also shows an example of details in the workflow management system server 210 shown in the example of FIG. 2.

While the workflow definition storage module 232, a confirmation processing data storage module 237, the item/operation state/history storage module 233 and the attribute data storage module 234 are shown to be stored in separate storages for ease of explanation in the example of FIG. 3, these modules may be stored in a single storage. Or, any combination of these modules may be stored in a single storage. For example, the item/operation state/history storage module 233 and confirmation operation state storage module 236 may be stored in a single storage and the attribute data storage module 234 and correction data storage module 235 may be stored in another storage.

A user interface 251 is provided in the client 250A and the like. The user interface 251 performs the following processing in accordance with the manipulation of the worker: instruction or data acquisition such as Definition registration 301 or Definition acquisition 305 related to generation of a workflow to the workflow definition management module 222; instruction or data acquisition such as Item activation 306 or an item list 312 related to a workflow item (including a plurality of operations) to the item manipulation module 223; instruction or data acquisition such as Attribute data acceptance 314, Operation completion 315, an operation list 320 or Input form acquisition 321 related to the operation in an item to the operation manipulation module 224; and instruction or data acquisition such as Correction data acceptance 322, Confirmation completion 323, a confirmation list 330, and Confirmation form acquisition 331 to the confirmation manipulation module 225.

The workflow definition management module 222 performs Saving 302, Reference 304 and the like concerning the data related to definition of a workflow to the workflow definition storage module 232 and performs instruction or data acquisition such as Definition registration 301 or Definition acquisition 305 concerning the data related to definition of a workflow to the user interface 251.

The workflow definition storage module 232 undergoes Definition reference 303 and the like by the workflow engine module 221 and Saving 302, Reference 304 and the like by the workflow definition management module 222. Examples of data stored into the workflow definition storage module 232 include a workflow definition table 900 shown in the example of FIG. 9, an operation definition table 1000 shown in the example of FIG. 10, a transition definition table 1100 shown in the example of FIG. 11, an attribute definition table 1200 shown in the example of FIG. 12, and a form definition table 1300 shown in the example of FIG. 13. These tables define a workflow.

FIG. 9 is an explanatory drawing of a data structure example of the workflow definition table 900. The workflow definition table 900 includes an ID column 901 and a definition name column 902. The ID column 901 stores an identifier to uniquely identify a workflow itself. The definition name column 902 stores the name of the workflow. For example, this column is used to present a workflow to the worker.

FIG. 10 is an explanatory drawing of a data structure example of the operation definition table 1000. The operation definition table 1000 includes an ID column 1001, a definition column 1002, and an operation name column 1003. The operation definition table 1000 stores an operation of a workflow. That is, the ID column 1001 stores an identifier to uniquely identify an operation. The definition column 1002 stores the identifier of a workflow including the operation (identifier defined in the ID column 901 of the workflow definition table 900). The operation name column 1003 stores the name of the operation. For example, this column is used to present an operation of a workflow to the worker. In the example of FIG. 10, operations of the workflow "Application for purchase" include "Application", "Approval by section manager", "Approval by department manager", "Procurement", "Accounting" and "General affairs".

FIG. 11 is an explanatory drawing of a data structure example of the transition definition table 1100. The transition definition table 1100 includes an ID column 1101, a transition source column 1102, and a transition destination column 1103. The transition definition table 1100 stores the structure of a workflow (execution order of operations). That is, the ID column 1101 stores an identifier to uniquely identify transition from an operation to another in a workflow. The transition source column 1102 stores the identifier of a transition source operation. The transition destination column 1103 stores the identifier of a transition destination operation. In the example of FIG. 11, the workflow "Application for purchase" makes transition from "Application" (operation identifier: 111) to "Approval by section manager" (operation identifier: 112), from "Approval by section manager" to "Approval by department manager" (operation identifier: 113), from "Approval by department manager" to "Procurement" (operation identifier: 114), from "Approval by department manager" to "Accounting" (operation identifier: 115), from "Procurement" to "General affairs" (operation identifier: 116), and from "Accounting" to "General affairs".

FIG. 12 is an explanatory drawing of a data structure example of the attribute definition table 1200. The attribute definition table 1200 includes an ID column 1201, a definition column 1202, an attribute name column 1203, and a data type column 1204. The attribute definition table 1200 stores the definition concerning an attribute as data processed in each workflow. That is, the ID column 1201 stores an identifier to uniquely identify the attribute as the data. The definition column 1202 stores the identifier of a workflow that uses the data. The attribute name column 1203 stores the name of the attribute as the data. For example, this column is used to present the data to the worker. The data type column 1204 stores the type (String type, Integer type and the like) of the data.

Figure 13:
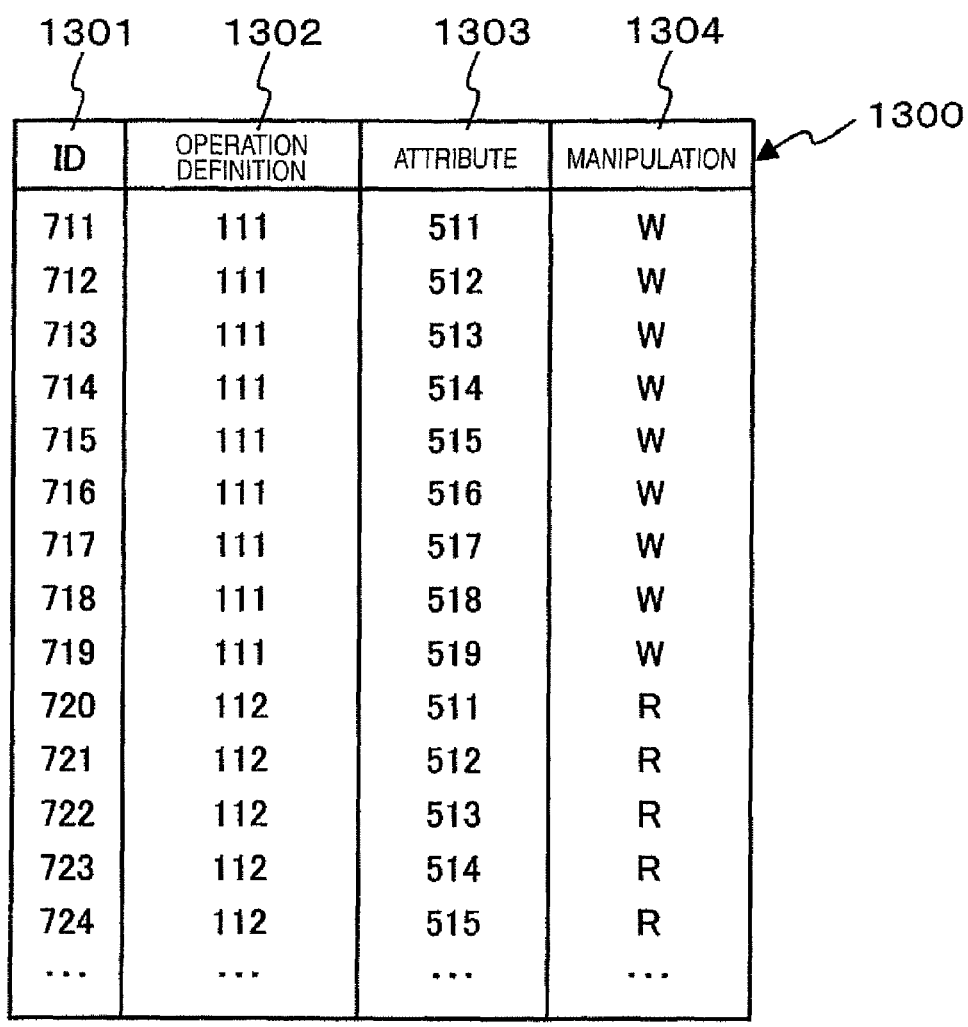
FIG. 13 is an explanatory drawing of a data structure example of the form definition table.

FIG. 13 is an explanatory drawing of a data structure example of the form definition table 1300. The form definition table 1300 includes an ID column 1301, an operation definition column 1302, an attribute column 1303, and a manipulation column 1304. The form definition table 1300 stores the definition concerning a form (form of a document and the like) to be presented to the user interface 251. That is, the ID column 1301 stores an identifier to uniquely identify the form. The operation definition column 1302 stores the identifier of an operation that uses the form (identifier defined in the ID column 1001 of the operation definition table 1000). The attribute column 1303 stores the identifier of the data as an attribute used in the form (identifier defined in the ID column 1201 of the attribute definition table 1200). The manipulation column 1304 stores the type of manipulation in the form ("W" indicates that data change is available and "R" indicates that data change is unavailable (display only)). The example shown in FIG. 13 indicates that the applicant, department, purchase name, unit price, quantity, procurement source, account number, budget category, and desired delivery time (attribute identifiers: 511 to 519) can be described in the user interface 251 in the operation "Application" (operation identifier: 111).

The item manipulation module 223 performs, concerning activation related to the workflow of an item, Item state change 307, Item information acquisition 311 and the like to the item/operation state/history storage module 233 and instruction acceptance or data presentation such as Item activation 306 or an item list 312 to the user interface 251.

The item/operation state/history storage module 233 undergoes State reference 308, History reference 309, State change 310 and the like by the workflow engine module 221, Item state change 307, Item information acquisition 311 and the like by the item manipulation module 223, and Operation information acquisition/change 313 and the like by the operation manipulation module 224. Examples of data stored into the item/operation state/history storage module 233 include an item execution state table 1500 shown in the example of FIG. 15 and an operation execution state table 1600 shown in the example of FIG. 16.

Figure 15:
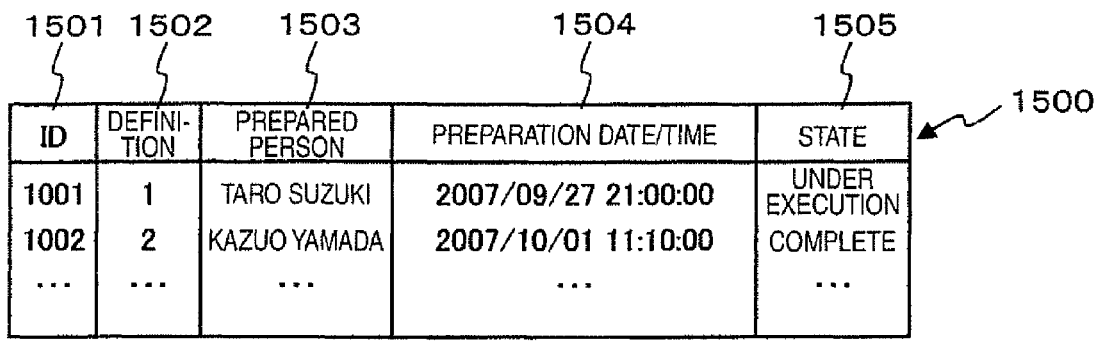
FIG. 15 is an explanatory drawing of a data structure example of the item execution state table.

FIG. 15 is an explanatory drawing of a data structure example of the item execution state table 1500. The item execution state table 1500 includes an ID column 1501, a definition column 1502, a prepared by column 1503, a preparation date/time column 1504, and a state column 1505. The item execution state table 1500 stores the execution state of the item in the workflow. That is, the ID column 1501 stores an identifier to uniquely identify the execution state per item. The definition column 1502 stores the identifier of the workflow of the item (identifier defined in the ID column 901 of the workflow definition table 900). The prepared by column 1503 stores the person who prepared the item (generally the first worker in this workflow). The preparation date/time column 1504 stores the date and time the item was prepared, that is, the data and time (including year, minute and second, if any) when the workflow of the item was activated. The state column 1505 stores the current state (Under execution, Complete and the like) of the item in the workflow.

Figure 16:
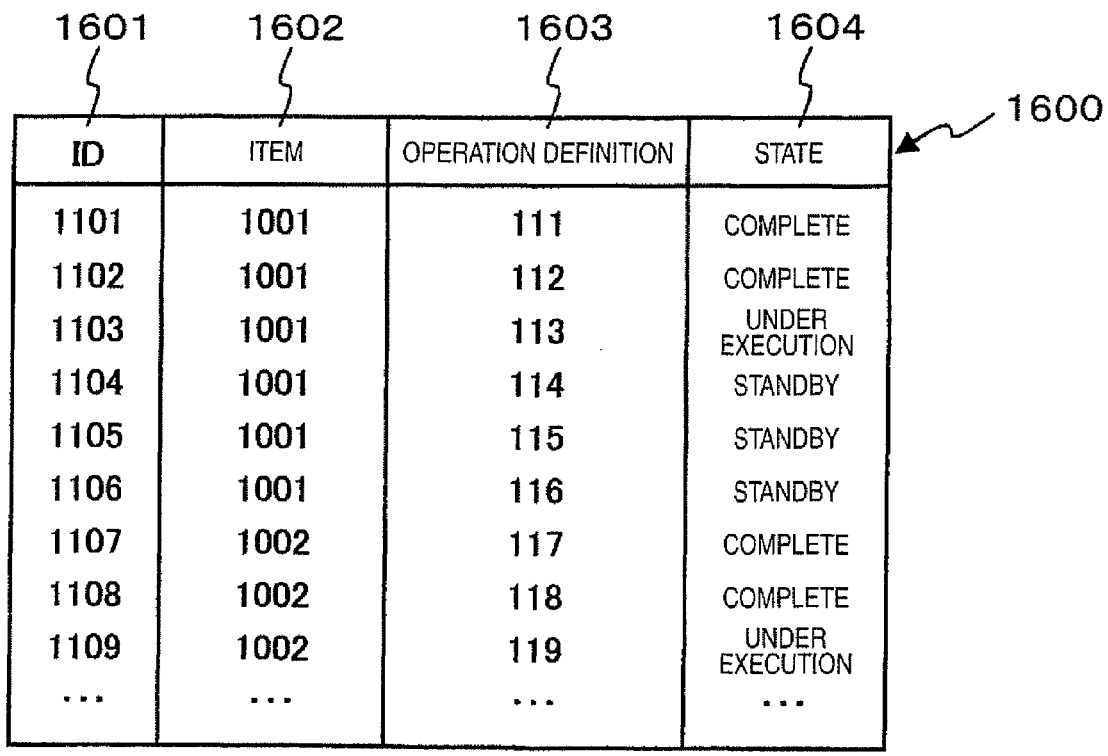
FIG. 16 is an explanatory drawing of a data structure example of the operation execution state table.

FIG. 16 is an explanatory drawing of a data structure example of the operation execution state table 1600. The operation execution state table 1600 includes an ID column 1601, an item column 1602, an operation definition column 1603, and a state column 1604. The operation execution state table 1600 stores the execution state of each operation in the workflow. That is, the ID column 1601 stores an identifier to uniquely identify the execution state per operation. The item column 1602 stores an identifier to uniquely identify an item including the operation (identifier defined in the ID column 1501 of the item execution state table 1500). The operation definition column 1603 stores an identifier to uniquely identify the operation (identifier defined in the ID column 1001 of the operation definition table 1000). The state column stores the current state (Under execution, Complete, Standby and the like) of the operation.

The operation manipulation module 224 performs, concerning data related to an operation in an item, Operation information acquisition/change 313 and the like to the item/operation state/history storage module 233, Attribute data registration 316, Attribute data update 317, Attribute data reference 319 and the like to the attribute data storage module 234, and instruction acceptance or data presentation such as Attribute data acceptance 314, Operation completion 315, an operation list 320 or Input form acquisition 321 to the user interface 251.

The attribute data storage module 234 undergoes Attribute data update (Correction data merge) 318 and the like by the workflow engine module 221 and Attribute data registration 316, Attribute data update 317, Attribute data reference 319 and the like by the operation manipulation module 224. An example of data stored into the attribute data storage module 234 is an attribute data table 1700 shown in the example of FIG. 17.

FIG. 17 is an explanatory drawing of a data structure example of the attribute data table 1700. The attribute data table 1700 includes an ID column 1701, an item column 1702, an attribute definition column 1703, and an attribute value column 1704. The attribute data table 1700 stores data described in the attribute presented to a form. That is, the ID column 1701 stores an identifier to uniquely identify the attribute. The item column 1702 stores an identifier to uniquely identify an item using the attribute (identifier defined in the ID column 1501 of the item execution state table 1500). The attribute definition column 1703 stores an identifier to uniquely identify the attribute (identifier defined in the ID column 1201 of the attribute definition table 1200). The attribute value column 1704 stores the data filled in as the attribute.

The confirmation manipulation module 225 performs Correction data registration 324, Correction data update 325, Confirmation state change 326, Correction data reference 329 and the like to the confirmation processing data storage module 237 and instruction acceptance or data presentation such as Correction data acceptance 322, Confirmation completion 323, a confirmation list 330, Confirmation form acquisition 331 and the like to the user interface 251.

The confirmation processing data storage module 237 includes the correction data storage module 235 and confirmation operation state storage module 236. The confirmation processing data storage module 237 undergoes Data reference 327, State change 328 and the like by the workflow engine module 221 and Correction data registration 324, Correction data update 325, Confirmation state change 326, Correction data reference 329 and the like by the confirmation manipulation module 225.

An example of data stored into the correction data storage module 235 is a correction data table 2000 shown in the example of FIG. 20. This stores the corrected data. An example of data stored into the confirmation operation state storage module 236 is a confirmation state table 1900 shown in the example of FIG. 19. This stores the confirmation state on the corrected data in each operation.

FIG. 20 is an explanatory drawing of a data structure example of the correction data table 2000. The correction data table 2000 includes an ID column 2001, an item column 2002, an attribute definition column 2003, and an attribute value column 2004. The correction data table 2000 stores correction data as an attribute. That is, the ID column 2001 stores an identifier to uniquely identify the corrected data. The item column 2002 stores an identifier to uniquely identify an item using the data that has been corrected (identifier defined in the ID column 1501 of the item execution state table 1500). The attribute definition column 2003 stores an identifier to uniquely identify the attribute as the corrected data (identifier defined in the ID column 1201 of the attribute definition table 1200). The attribute value column 2004 stores the corrected data.

FIG. 19 is an explanatory drawing of a data structure example of the confirmation state table 1900. The confirmation state table 1900 includes an ID column 1901, an item column 1902, an operation definition column 1903, and a state column 1904. The confirmation state table 1900 stores the confirmation state concerning the corrected data in each operation. That is, the ID column 1901 stores an identifier to uniquely identify the confirmation state concerning corrections made in each operation. The item column 1902 stores an identifier to uniquely identify an item including the confirmation (identifier defined in the ID column 1501 of the item execution state table 1500). The operation definition column 1903 stores an identifier to uniquely identify the operation including the confirmation (identifier defined in the ID column 1001 of the operation definition table 1000). The state column 1904 stores the confirmation state (Under execution, Complete, Standby and the like). The confirmation state table 1900 may be generated each time the attribute is corrected. In such a case, the confirmation state table 1900 is generated for each row in the correction data table 2000.

The workflow engine module 221 performs identification of an operation to be executed and the like based on a workflow. The workflow engine module 221 performs Definition reference 303 and the like to the workflow definition storage module 232, State reference 308, History reference 309, State change 310 and the like to the 233, Attribute data update (Correction data merge) 318 and the like to the attribute data storage module 234, and Data reference 327, State change 328 and the like to the confirmation processing data storage module 237.

The processing in the change request acceptance module 110, change operation identification module 120, notification module 130, operation shift suppression module 150, and branching operation processing module 160 in the embodiment shown in FIG. 1 is mainly performed by the confirmation manipulation module 225 and workflow engine module 221 by using the confirmation processing data storage module 237. This is true to Attribute data update (Correction data merge) 318 and the like performed by the workflow engine module 221 to the attribute data storage module 234. The processing in the standard operation identification module 140 is mainly performed by the operation manipulation module 224 and workflow engine module 221 by using the attribute data storage module 234.

Figure 4:
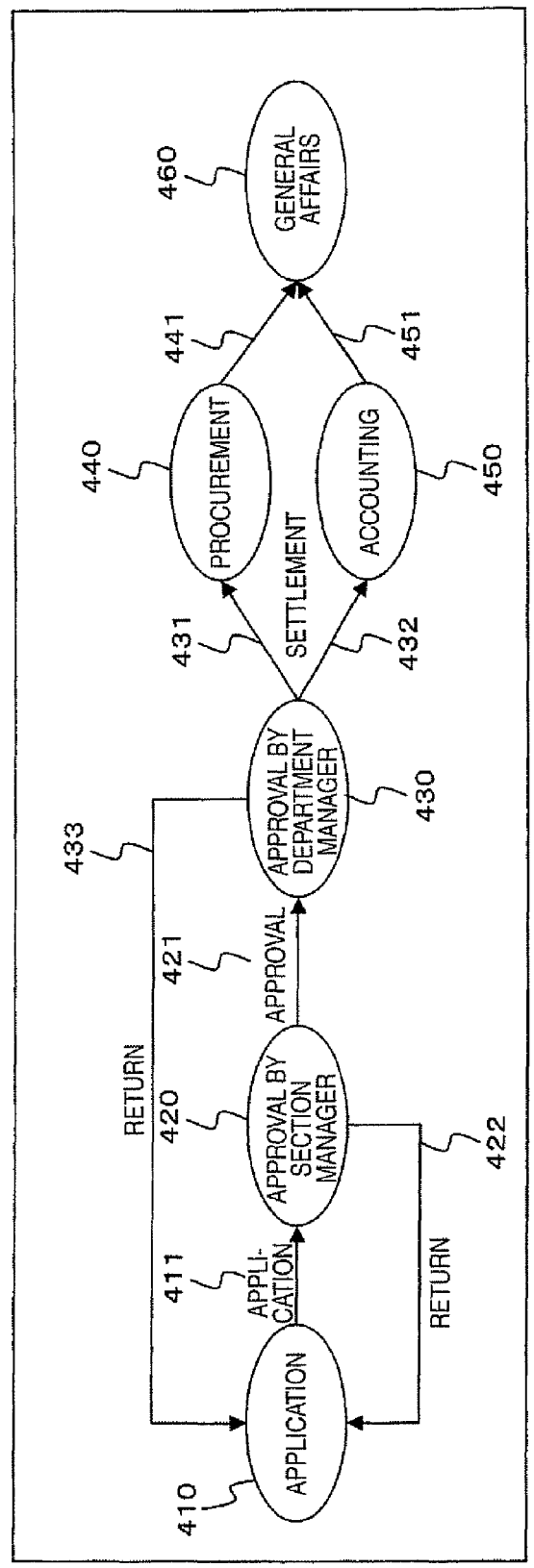
FIG. 4 is an explanatory drawing of a workflow example of target application for/approval of purchase.

FIG. 4 is an explanatory drawing of a workflow example of target application for/approval of purchase.

The definition of the workflow shown in the example of FIG. 4 is made by using the tables shown in FIGS. 9 to 13. That is, Application 410 is followed by Approval by section manager 420 and Approval by department manager 430. Then Procurement 440 and Accounting 450 take place in parallel and finally "General affairs" 460 is executed.

While the operation of the worker is described for ease of explanation in the description of Application 410 and the like, it goes without saying that each module in the workflow management system server 210 operates in accordance with the manipulation of the worker in the user interface 251.

In Application 410, the applicant as a worker inputs the details of application to activate a workflow and requests the section manager to approve the purchase of an article (Application 411).

In Approval by section manager 420, the section manager as a worker checks the application details and determines to (1) reject the application; (2) approve the application and proceeds to the next step Approval by the department manager 430 (Approval 421); or (3) returns the application form to the applicant for correction of the application details (return 422 as an instruction of retry).

In Approval by department manager 430, the department manager as a worker determines approval, rejection or return (Return 433) in the same way as Approval by section manager 420. If wishing to approve the application, the department manager determines completion of settlement and forwards the application to the purchase procedure including procurement and accounting (Settlement 431, Settlement 432).

In Procurement 440, the procurement department as a worker places an order of an article from the procurement source.

In Accounting 450, the accounting department as a worker pays the charge to the procurement source.

In General affairs 460, the general affairs department as a worker enters the application in the asset management ledger of purchases.

This embodiment pertains to the procedure followed by the applicant for minor corrections not affecting in particular whether to reject or approve the application in case the application form contains an error to be corrected in the operation process of Approval by section manager 420 or Approval by department manager 430.

Figure 5:
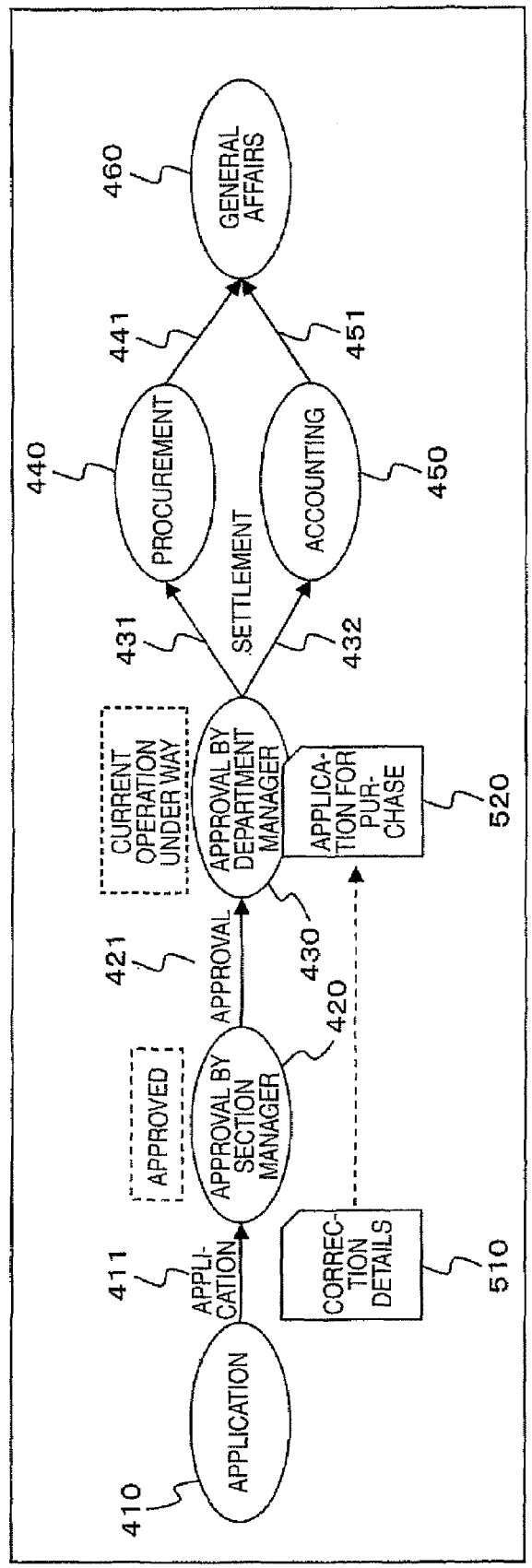
FIG. 5 is an explanatory drawing of a workflow example of application for/approval of purchase illustrating an example of processing in this embodiment.

FIG. 5 is an explanatory drawing of a workflow example of application for/approval of purchase illustrating an example of processing in this embodiment. In this example, the application form is not returned in Approval by section manager 420 or Approval by department manager 430 but the applicant as a worker of Application 410 has found an error in the application form and corrects the error as an operation result. The applicant issues a correction request and requests confirmation from the worker who is already engaged in the operation on the application form. The confirmation of the correction proceeds to catch up with the operation currently under way. The term confirmation refers to admitting approval of correction of already approved data, if any. While the applicant corrects the details as an operation result in this example, the applicant is not the only person to make corrections. Any worker in the path of the workflow may correct the application form.

Detailed description will be given below.

In the operation of Application 410 already complete, the applicant as a worker corrects the already inputted data and requests confirmation.

For example, as in an application and a details correction screen 600 shown in the example of FIG. 6A, the worker fills in respective values in an applicant column 611, a department column 612, a purchase name column 613, a unit price column 614, a quantity column 615, a procurement source column 616, an account number column 617, a budget category column 618, and a desired delivery time column 619 in the item "Purchase workflow". The applicant selects an Approval Request button 621 to perform the processing of Application 411.

That is, the item manipulation module 223 presents an item list 312 to the user interface 251 using the workflow definition table 900. Then the item manipulation module 223 accepts Item activation 306 in the workflow of application for purchase. The item manipulation module 223 enters that the item is under execution in the item execution state table 1500 and causes the operation manipulation module 224 to present the application and details correction screen 600 to the user interface 251 by using the workflow engine module 221, the form definition table 1300 and the like. The operation manipulation module 224 performs attribute data acceptance 314 for each column of the application and details correction screen 600.

After Application 411, the applicant finds an error in the unit price column 614, account number column 617 or desired deliver time column 619 in the application and details correction screen 600 and corrects the error (refer to correction details 510, FIG. 6B). The applicant selects a Correction Confirmation Request button 631 to perform processing of correction confirmation.

That is, the confirmation manipulation module 225 performs Correction data acceptance 322 from the user interface 251 in accordance with the manipulation of the applicant and accepts a confirmation request. In other words, the confirmation manipulation module 225 accepts a change request to the operation result by the finished operation. The confirmation manipulation module 225 performs Correction data registration 324 or Correction data update 325 to the confirmation processing data storage module 237. At this point in time, the operation under way undergoes Approval by department manager 430. That is, the operation has been approved as of the point in time of Approval by section manager 420.

The confirmation manipulation module 225 uses the workflow engine module 221 to extract the current operation under way from the operation execution state table 1600 and identifies an operation from the operation for which data was corrected (Application 410) as a start point to the extracted current operation under way (Department manager 430). That is, the confirmation manipulation module 225 extracts an operation to be confirmed. In this example, Approval by section manager 420 and Approval by department manager 430 are extracted. This processing is made when the confirmation manipulation module 225 extracts, by way of the processing by the workflow engine module 221, the current operation under way from the operation execution state table 1600 and uses the transition definition table 1100 to analyze the operation procedure and extracts an operation as a start point to the current operation under way. The extracted operation is a candidate for an operation to be confirmed.

The confirmation manipulation module 225 excludes an operation irrelevant to partial correction data. In case an operation between the operation as a start point and an operation as an endpoint does not include the correction data, the operation is skipped. For example, control is possible where, in case the correction in the application and details correction screen 600 shown in the example of FIG. 6B does not include correction in the unit price column 614, confirmation by the section manager of the corrections in the account number column 617 and desired delivery time column 619 is determined unnecessary and Approval by section manager in the confirmation screen 700 shown in the example of FIG. 7 is skipped.

Data necessary for each operation is previously defined in association with each operation. In the above example, a definition table is previously provided where only the approval of unit price is associated with Approval by section manager 420 and approval of unit price, account number and the like are associated with Approval by department manager 430. The confirmation manipulation module 225 extracts an operation irrelevant to the attribute as corrected data by using such a definition table, the attribute data table 1700 and the like. This example includes correction of unit price so that Approval by section manager 420 or Approval by department manager 430 is not excluded. Thus, the endpoint of an operation to be confirmed is Approval by department manager 430. Even in case the current work under way is an operation irrelevant to the attribute as corrected data, the endpoint is the current operation under way.

Or, only an operation for which operation completion is accepted may be extracted. In such a case, Approval by department manager 430 is in the midst of an operation and does not mean completion of operation. Thus the endpoint is the immediately preceding Approval by section manager 420.

By assuming selection of the Correction Approval Request button 631 as a trigger, the confirmation manipulation module 225 presents an event that correction has been made to the data under operation to the user interface 251 manipulated by the worker of the current operation under way. The current operation under way is extracted by the confirmation manipulation module 225 by using the workflow engine module 221 as described above.

By assuming selection of the Correction Approval Request button 631 as a trigger, the confirmation manipulation module 225 suppresses a shift from the current operation under way to the next operation, that is, suspends the processing made by the operation manipulation module 224.

In the operation of Approval by section manager 420 that is already approved, corrections are specified to the section manager as a worker and the section manager selects "Confirm" or "Reject" in response.

For example, the confirmation manipulation module 225 presents a screen such as a confirmation screen 700 shown in the example of FIG. 7 to the user interface 251 being manipulated by the section manager. The confirmation screen 700 includes an applicant column 711, a department column 712, a purchase article name column 713, a unit price column 714, a quantity column 715, a Confirm button 721, and a Reject button 722. That is, the applicant column 711 and the department column 712 present information concerning the corrector. The unit price column 714 presents corrected data and the purchase article name column 713 and the quantity column 715 concerning the purchase are then presented. Uncorrected data may be presented in a form different from that of the corrected data. While the confirmation screen 700 is presented per corrected attribute, the screen may present a plurality of corrected attributes.

In case the Confirm button 721 is selected, execution proceeds to confirmation of approval of department manager 430 as the next operation process.

In case the Reject button 722 is selected, the applicant who has made corrections selected "Correction withdrawal" or "Application withdrawal".

For example, the confirmation manipulation module 225 presents a screen such as a selection screen 800 for the corrector upon rejection shown in the example of FIG. 8 to the user interface 251 being manipulated by the worker who has made corrections. The selection screen 800 for the corrector upon rejection includes a unit price column 811, an option 812, an option 813, and an Execute button 821. The unit price column 811 as corrected data (or another column in which other corrections have been made) is presented to show the rejected corrections. The option 812 "Correction withdrawal (Continue with the uncorrected details)" or the option 813 "Application withdrawal (Discontinue the item)" is presented for selection of either of the two.

In case the option 812 is selected, the correction is assumed nonexistent and the current operation under way is continued. That is, the processing by the operation manipulation module 224 that has been suspended is continued.

In case the Confirm button 721 is selected in Approval 421, the confirmation processing has caught up before the operation by Approval by department manager 430 takes place. Accordingly, the application for purchase is replaced with (or merged with) the corrected details. The department manager as a worker of Approval by department manager 430 confirms or rejects the corrected application details without a need to know the corrections. That is, in case corrections are approved in an operation earlier than the current operation under way while the latter is not complete, the corrected data is used to perform the operation. The confirmation manipulation module 225 overwrites the data in the correction data storage module 235 and confirmation operation state storage module 236 and the workflow engine module 221 uses the corrected data to continue the operation by the operation manipulation module 224.

Control is possible where, in case all operations are complete and confirmation is made in all operations, the corrections are replaced with the final processing result and in case the corrections are rejected in any operation, the worker as a corrector cannot select "Application withdrawal". That is, the option 813 may not appear in the selection screen 800 for the corrector upon rejection shown in the example of FIG. 8.

The confirmation processing by the confirmation manipulation module 225 is made on each executed operation via a route on which operations have been executed by using the operation execution state table 1600 and transition definition table 1100.

Figure 14:
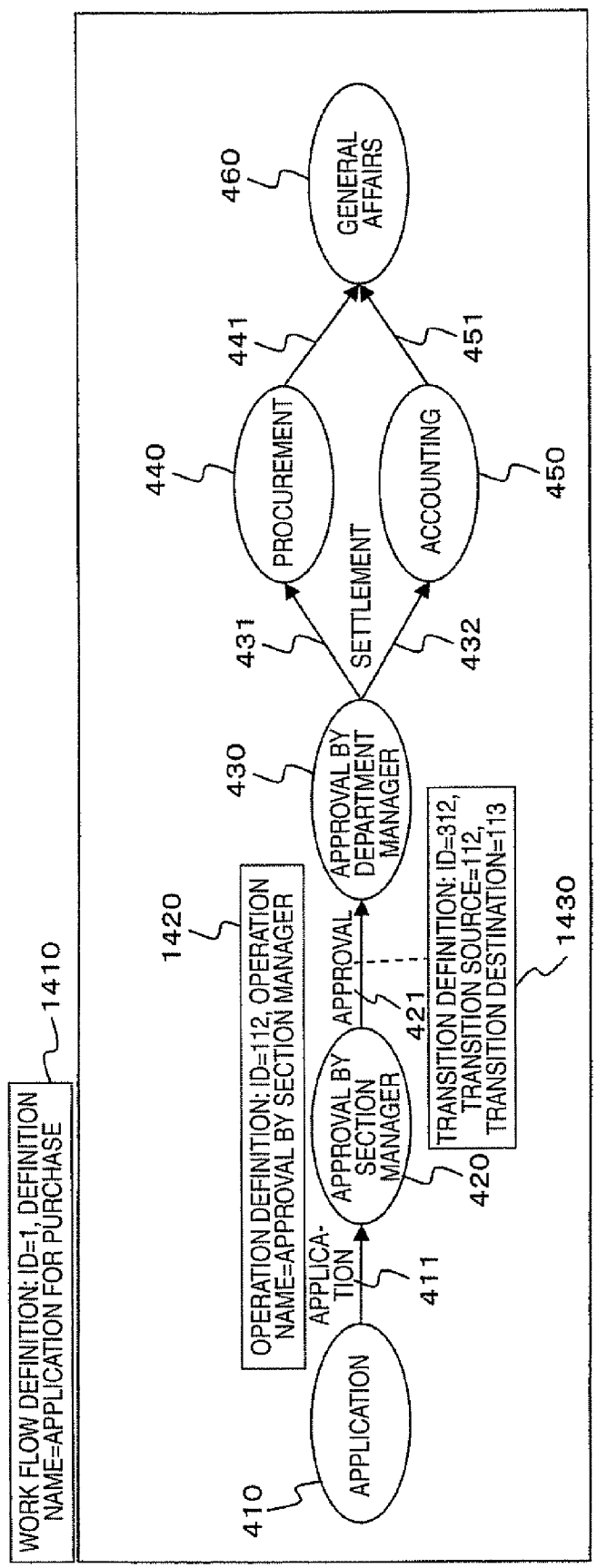
FIG. 14 is an explanatory drawing of a workflow definition example of a workflow example of application for/approval of purchase processed by this embodiment.

FIG. 14 is an explanatory drawing of a workflow definition example of a workflow example of application for/approval of purchase processed by this embodiment. FIG. 14 describes, using a specific example, the data structure in the workflow definition storage module 232 in the workflow shown in the example of FIG. 5.

In the workflow definition 1410 of the workflow itself shown in FIG. 14 (FIG. 5), the ID of the workflow in the first row in the workflow definition table 900 shown in the example of FIG. 9 is "1" and the definition name is "application for purchase" (workflow definition: ID=1, definition name=Application for purchase). In the operation definition 420 of Approval by section manager 1420, the ID of the operation in the second row in the operation definition table 1000 shown in the example of FIG. 10 is "112" and the operation name is "Approval by section manager" (operation definition: ID=112, operation name=Approval by section manager). In the transition definition 1430 of Approval 421, the ID of the transition in the second row in the transition definition table 1100 shown in the example of FIG. 11 is "312", the transition source is "112", and the transition destination is "113" (transition definition: ID=312, transition source=112, transition destination=113).

Figure 18:
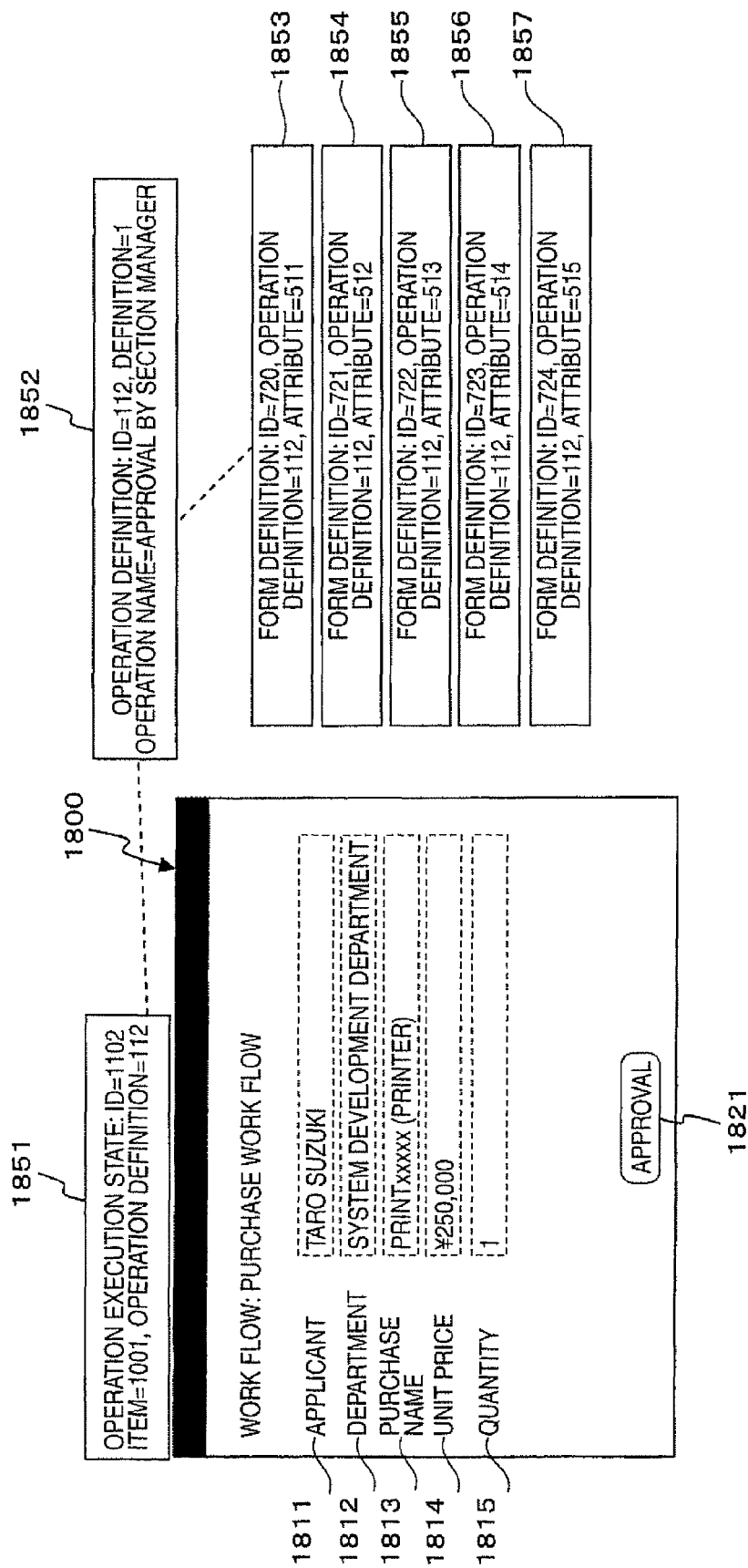
FIG. 18 is an explanatory drawing of an approval screen example and a data structure example such as operation definition.

FIG. 18 is an explanatory drawing of an approval screen example and a data structure example such as operation definition. That is, FIG. 18 describes, using a specific example, the data structures in the workflow definition storage module 232 and item/operation state/history storage module 233 in Approval by section manager 420 in the workflow shown in the example of FIG. 5.

An approval screen 1800 of the "Approval by section manager" operation includes an applicant column 1811, a department column 1812, a purchase name column 1813, a unit price column 1814, a quantity column 1815, and an Approve button 1821. These are generated from the 10th to 14th rows (form definition: ID=720, operation definition=112, attribute=511 and the like) in the form definition table 1300 shown in the example of FIG. 13. That is, columns from the applicant column 1811 to the quantity column 1815 in the approval screen 1800 of the "Approval by section manager" operation are respectively generated by the form definition 1853 through form definition 1857. In the operation definition 1852 of Approval by section manager 420 shown in the example of FIG. 5, the ID of the operation in the second row in the operation definition table 1000 shown in the example of FIG. 10 is "112", the workflow definition is "1", and the operation name is "Approval by section manager" (operation definition: ID=112, definition=1, operation name=Approval by section manager). In the operation execution state 1851 (that is, the operation presenting the approval screen 1800 of the "Approval by section manager" operation) of Approval by section manager 420 shown in the example of FIG. 5, the ID of the operation execution state in the second row in the operation execution state table 1600 shown in the example of FIG. 16 is "1102", the ID of the item is "1001", and the operation definition is "112" (operation execution state: ID=1102, item=1001, operation definition-112).

Figure 21:
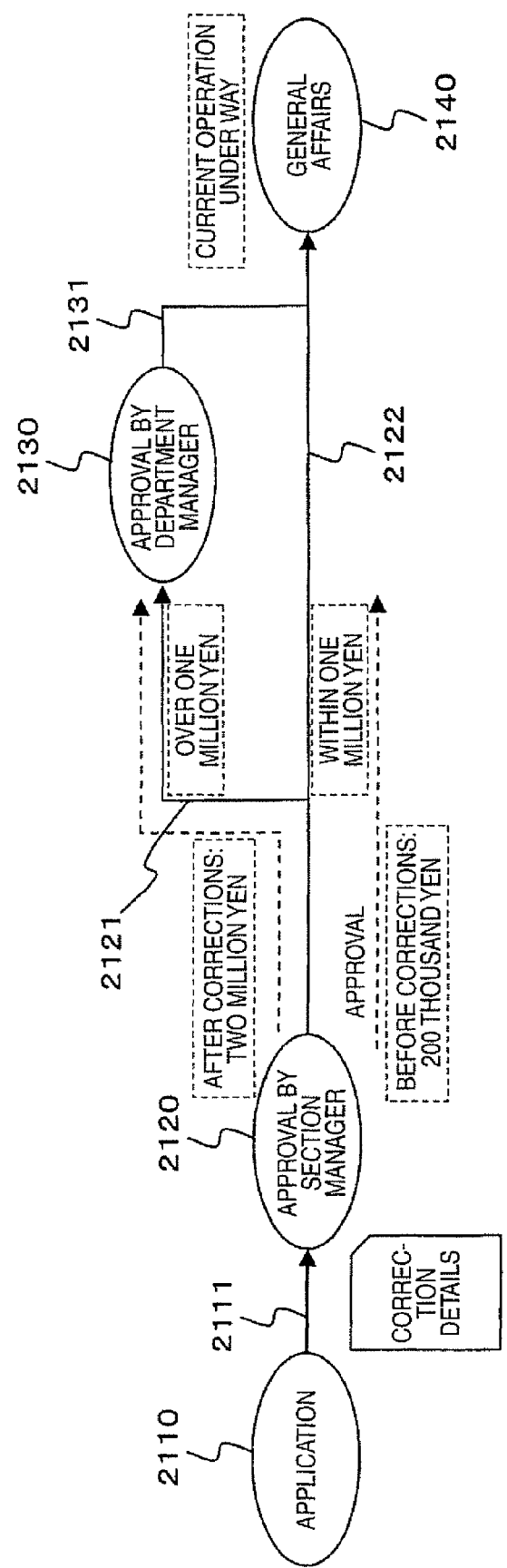
FIG. 21 is an explanatory drawing of a workflow example including branches illustrating a processing example according to this embodiment.

FIG. 21 is an explanatory drawing of a workflow example including branches illustrating a processing example according to this embodiment.

Execution makes transition from Application 2110 to Approval by section manager 2120. In case the purchase amount is within one million yen, execution makes transition to Accounting 2140. In case the purchase amount exceeds one million yen, execution makes transition to Approval by department manager 2130, and then to Accounting 2140.

In such a workflow, assume a case:

(1) Application for purchase 2110 is made with a purchase amount of 200 thousand yen.

(2) Then Approval by section manager 2120 is complete and Approval by department manager is made unnecessary since the branching condition of within one million yen is satisfied, and processing is in Accounting 2140.

(3) In the above case, the applicant has corrected the purchase 2110 amount to two million yen and requested confirmation.

The corresponding processing is as follows:

(1) The confirmation manipulation module 225 uses the workflow engine module 221 to detect that the transition destination is different before and after the corrections. That is, the execution history is referenced for data before corrections. The branching condition for the correction details confirmed is determined. The execution history includes the correction details (target item and values before and after corrections) and history of confirmation (including selection of confirmation or rejection) that are stored together with an ordinary execution history for later reference.

(2) The confirmation manipulation module 225 suppresses a shift from confirmation to next operation. The confirmation manipulation module 225 presents an "application cancellation" screen to the user interface 251 for the worker engaged in the operation as an original destination. The "application cancellation" screen lets the worker to select approval or rejection as well as confirmation with a difference that approval means cancellation of the above operation.

(A) In case "Approval" is selected, execution proceeds to application cancellation for the next operation process.

In case application cancellation for all operations at the destination is approved, execution branches to a new destination that is based on the corrected details.

(B) In case "Rejection" is selected, "Correction withdrawal" or "Application withdrawal" is selected by the applicant who has made corrections. A screen equivalent to the selection screen 800 for the corrector upon rejection shown in the example of FIG. 8 is presented to the user interface 251. In case "Correction withdrawal" is selected, execution continues with the uncorrected details. In case "Application withdrawal" is selected, the item is discontinued.

The example shown in FIG. 21 will be detailed.

(1) The confirmation manipulation module 225 detects that the destination is different before and after corrections at the branch following confirmation in Approval by section manager 2120.

(2) Upon confirmation in Approval by section manager 2120, a transition to the operation of Approval by department manager 2130 is suppressed. "Application cancellation" is issued to the branch making transition to the operation of Accounting 2140. That is, "Application cancellation" is presented to the user interface 251 for the worker engaged in Accounting 2140.

In case the worker engaged in Accounting 2140 is available by way of cancellation of amount payment or the like, "Approval" of "Application cancellation" is selected.

(3) In case "Application cancellation" is approved for all operations before corrections (this may be determined based on the absence of transition to next operation), cancellation of branches before correction is in effect so that execution makes transition to the operation of Approval by department manager 2130. In the operation of Approval by department manager 2130, uncorrected data is replaced with corrected data. That is, operation starts with the corrected data.

(4) Upon approval in Approval by department manager 2130, execution makes transition to the operation of Accounting 2140 and the corrected purchase amount of two million yen is paid.

In order to manage the execution state of "Application cancellation", an application cancellation state table 2200 is provided on top of the operation execution state table 1600 and confirmation state table 1900. Or, these tables may be put together to form an execution type table 2300 including the "execution type" information used to determine the current state.

FIG. 22 is an explanatory drawing of a data structure example of the application cancellation state table 2200. The application cancellation state table 2200 includes an ID column 2201, an item column 2202, an operation definition column 2203, and a state column 2204. The application cancellation state table 2200 manages the execution state of "Application cancellation". That is, the ID column 2201 stores an identifier to uniquely identify the execution state of "Application cancellation". The item column 2202 stores an identifier to uniquely identify an item including the operation of "Application cancellation" (identifier defined in the ID column 1501 of the item execution state table 1500). The operation definition column 2203 stores an identifier to uniquely identify an operation of which "Application cancellation" is determined (identifier defined in the ID column 1001 of the operation execution state table 1000). The state column 2204 stores the current state of "Application cancellation" (Under execution, Approved, Rejected, Standby and the like).

FIG. 23 is an explanatory drawing of a data structure example of the execution type table 2300. The execution type table 2300 includes an ID column 2301, an item column 2302, an operation definition column 2303, a state column 2304, and an execution type column 2305. The execution type table 2300 has functions of the operation execution state table 1600, confirmation state table 1900, and application cancellation state table 2200. That is, the ID column 2301 stores an identifier to uniquely identify the execution state of "Operation execution", "Confirmation" or "Application cancellation". The item column 2302 stores an identifier to uniquely identify an item including "Operation execution" or the like (identifier defined in the ID column 1501 of the item execution state table 1500). The operation definition column 2303 stores an identifier to uniquely identify an operation of which "Operation execution" or the like is effected (identifier defined in the ID column 1001 of the operation execution state table 1000). The state column 2304 stores the current state of "Operation execution" or the like (Under execution, Complete, Approved, Rejected, Standby and the like). The execution type column 2305 stores execution state as to which of "Operation execution", "Confirmation" or "Application cancellation" is indicated.

In case all operations are complete, same as the above case of confirmation, control may be made to inhibit "Application cancellation".

For an operation that is not yet started, it may be assumed that approval of "Application cancellation" is selected.

"Application cancellation" is made on each operation in the path on which operations have been executed as described in the execution history. Selection of Approval or Rejection of Application cancellation in the operations may be done in the order of execution, or in the reverse order of execution, or simultaneously for all operations.

In case Application cancellation of a plurality of operations in a branch before corrections is checked and Application cancellation is approved up to the branching section, the confirmation manipulation module 225 may notify the worker in charge of the checkup of Application cancellation after the branching that cancellation of the operations up to the branching section is in effect.

With this function, the worker "approves" cancellation in case cancellation is available, that is, upon receiving a notice that cancellation of the operations up to the branching section is approved.

In this case, a deadline for cancellation of operations may be specified for "Approval" of application cancellation and "Rejection" may be assumed when the deadline is reached in order to avoid a case where cancellation of operations is no longer available with the elapse of time.

Figure 24:
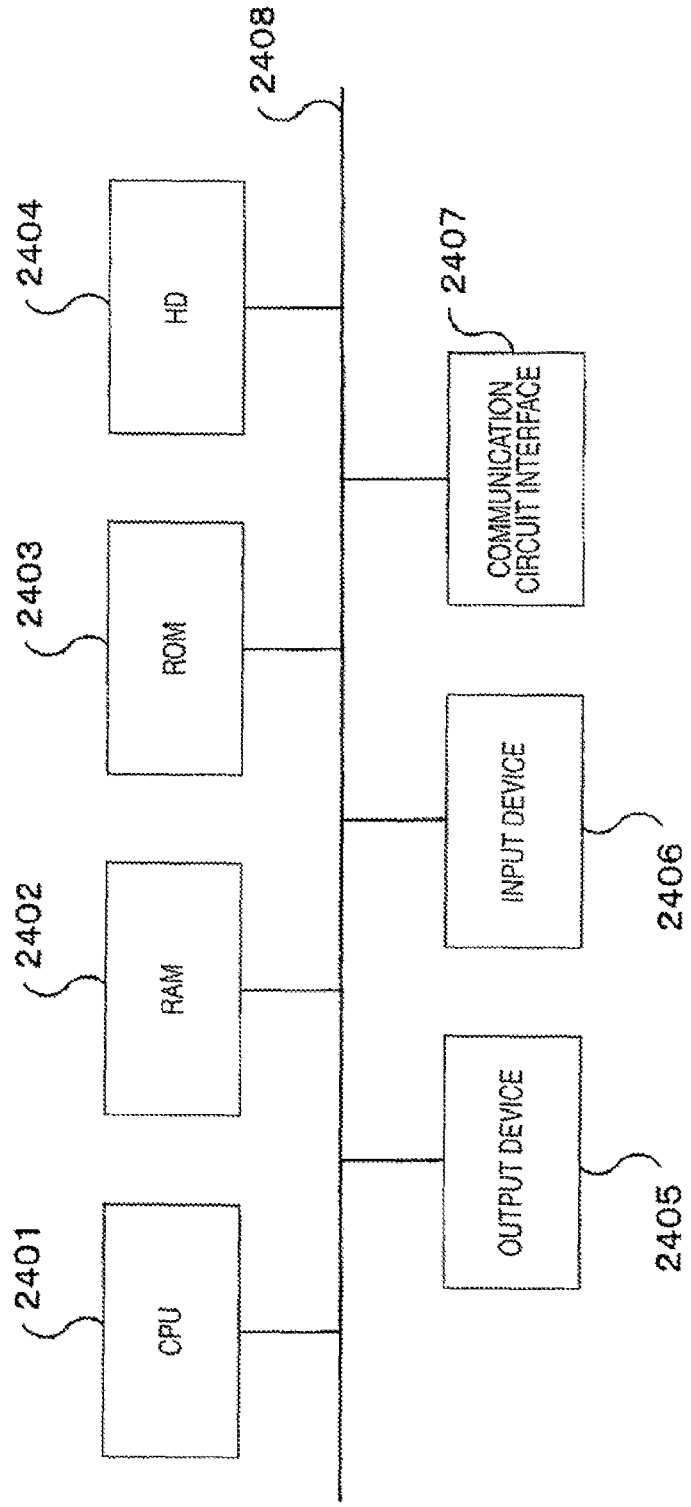
FIG. 24 is a block diagram a hardware configuration example of a computer to implement this embodiment.

The hardware configuration of a computer on which the program as this embodiment is executed is a general computer as shown in FIG. 24 and in particular a personal computer, a computer that may function as a server or the like. The computer is composed of: a CPU 2401 (CPU is used as an arithmetic part in this example) for executing programs in the change request acceptance module 110, change operation identification module 120, notification module 130, standard operation identification module 140r operation shift suppression module 150, branching operation processing module 160 and the like; a RAM 2402 for storing the programs or data; a ROM 2403 storing programs and the like used to boot the computer; an HD 2404 as an auxiliary storage (for example a hard disk may be used); an input device 2406 for inputting data such as a keyboard or a mouse; an output device 2405 such as a CRT or a liquid crystal display; a communication circuit interface 2407 (for example a network interface card may be used) for connecting to a communication network; and a bus 2408 for interconnecting these components to perform data exchange. A plurality of such computers may be networked.

An embodiment provided as a computer program among those embodiments described above may be implemented by reading a computer program as a software product into the hardware system and through cooperation of software and hardware resources.

The hardware configuration shown in FIG. 24 is an example. This embodiment is not limited to the configuration shown in FIG. 24 but any configuration capable of executing the modules described in this embodiment may be employed. For example, some of the modules may be provided as dedicated hardware components such as an ASIC. Or, some modules may be located in an external system and connected to the inventive system via a communication circuit. A plurality of systems each configure as shown in FIG. 24 may be networked via a communication circuit for coordinated operation. In particular, the modules may be incorporated into a home information appliance, a copier, a facsimile, a scanner, a printer, or a multifunction device (an image processor having any two or more functions of a scanner, a printer, a copier, a facsimile and the like) as well as into a personal computer.

While correction of an operation result is taken as an example in the foregoing embodiment, modifications such as addition and deletion are within the scope of the invention.

The presentation to the user interface 251 may be voice output or the like as well as presentation on a display device such as a display, or a combination of these may be used.

The notification may include notification via an e-mail, chat and the like.

The program described above may be provided on a recording medium or via communication means. In such a case, for example, the program described above may be understood as the invention of a "computer-readable recording medium on which a program is recorded".

The "computer-readable recording medium on which a program is recorded" refers to a computer-readable recording medium on which a program is recorded that is used to install, execute or circulate the program.

A recording medium used in the invention may be a digital versatile disk (DVD), in particular a "DVD-R, DVD-RW, DVD-RAM and the like" as standards developed by the DVD Forum or a "DVD+R, DVD+RW and the like" as standards developed by DVD+RW, or a compact disk (CD) such as a read-only memory (CD-ROM), a CD-Recordable (CD-R), a CD-Rewritable (CD-RW), or a Blue-ray disk, a magneto-optical disk (MO), a flexible disk (FD), a magnetic tape, a hard disk, a read-only memory (ROM), an electrically erasable and programmable ROM (EEPROM), a flash memory, a random access memory (RAM) and the like.

The programs or some of the programs may be recorded on the recording medium for storage or circulation. Such programs may be transmitted via communications by using a transmission media including a wired network used for a local area network (LAN), a metropolitan area network (MAN), a wide area network (WAN), the Internet, an intranet, an extranet and the like, or a wireless communication network, or a combination thereof, or may be conveyed over carrier waves.

The above program may be part of another program or recorded on a recording medium together with a separate program. The program may be divided and recorded on multiple recording media. The program may be recorded in any form such as a compressed or encrypted form, as long as the program can be restored.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A non-transitory computer readable medium storing a program causing a computer to execute a process configured to control an operation procedure beginning with an application, the operation procedure comprises a plurality of operations, and wherein the computer stores (i) an operation procedure table that includes identifications of transition source operations and identifications of transition destination operations in the operation procedure in association with each other, (ii) an execution state table that includes a state of the operation procedure, which indicates that the operation procedure is under execution or that the operation procedure is completed, and (iii) an operation state table that includes identifications of the operations in the operation procedure and current states thereof, the computer accepts manipulations, and the computer displays screens, the process configured to control the operation procedure comprising:

upon a manipulation of the operation procedure, accepting a change request to change an operation result of a first operation, wherein the first operation has been executed prior to a current execution-permitted operation which is permitted to execute in accordance with the operation procedure, and the operation state table shows that the first operation is completed;

extracting a second operation under execution with reference to the operation state table;

identifying operations from the first operation to the second operation with reference to the operation procedure table;

if the change request is accepted, accepting confirmation or rejection of the change request in accordance with manipulations corresponding to the identified operations;

if a manipulation corresponding to the identified operations issues a rejection of the change request, presenting a selection screen, wherein the selection screen includes a first option for instructing a withdrawal of the change request and a second option for instructing a withdrawal of the application for the operation procedure;

if a manipulation corresponding to the identified operations issues a rejection of the change request in a state that the execution state table shows that the operation procedure is completed, controlling the selection screen to not display the second option so as to prevent the withdrawal of the application from being instructed; and if the change request is accepted, sending a notification of the execution-permitted operation, that the change request is accepted.

2. The computer readable medium in claim 1, wherein the computer further stores a definition table that includes the operations and necessary data for the corresponding operations in association with each other, and the identifying step identifies an operation by excluding an operation which is not affected by the changed operation result of the first operation with reference to the definition table.

3. The computer readable medium as claimed in claim 1, wherein if an end point of the identified operations shows the current execution permitted operation or an operation later than the current execution-permitted operation, the identifying step identifies the execution-permitted operation as the endpoint with reference to the operation state table.

4. The computer readable medium in claim 1, further comprising:

if the identified operation includes an operation having been executed prior to the current execution-permitted operation with reference to the operation state table, suppressing a shift from the current execution-permitted operation to the operation later than the current execution-permitted operation.

5. The computer readable medium in claim 1, wherein the operation procedure has a branch according to the operation procedure table, and the process further comprises:

if a procedure of the identified operations includes a branch section, canceling already executed operations.

6. An operation controlling method causing a computer to execute a process for controlling an operation procedure beginning with an application, wherein the operation procedure comprises a plurality of operations, the computer stores (i) an operation procedure table that includes identifications of transition source operations and identifications of transition destination operations in the operation procedure in association with each other, (ii) an execution state table that includes a state of the operation procedure, which indicates that the operation procedure is under execution or that the operation procedure is completed, and (iii) an operation state table that includes identifications of the operations in the operation procedure and current states thereof, the computer accepts manipulations, and the computer displays screens, the method comprising:

upon a manipulation of the operation procedure, accepting a change request to change an operation result of a first operation, wherein the first operation has been executed prior to a current execution-permitted operation which is permitted to execute in accordance with the operation procedure, and the operation state table shows that the first operation is completed;

extracting a second operation under execution with reference to the operation state table;

identifying operations from the first operation to the second operation with reference to the operation procedure table; and if the change request is accepted, accepting confirmation or rejection of the change request in accordance with manipulations corresponding to the identified operations;

if a manipulation corresponding to the identified operations issues a rejection of the change request, presenting a selection screen, wherein the selection screen includes a first option for instructing a withdrawal of the change request and a second option for instructing a withdrawal of the application for the operation procedure;

if a manipulation corresponding to the identified operations issues a rejection of the change request in a state that the execution state table shows that the operation procedure is completed, controlling the selection screen to not display the second option so as to prevent the withdrawal of the application from being instructed; and if the change request is accepted, sending a notification of the execution-permitted operation, that the change request is accepted.

7. An operation control system configured to control an operation procedure beginning with an application, the operation procedure comprising a plurality of operations, the system comprising:
- a storing device that stores
  - (i) an operation procedure table that includes identifications of transition source operations and identifications of transition destination operations in the operation procedure in association with each other,
  - (ii) an execution state table that includes a state of the operation procedure, which indicates that the operation procedure is under execution or that the operation procedure is completed, and
  - (iii) an operation state table that includes identifications of the operations in the operation procedure and current states thereof,
- an accepting device that accepts manipulations;
- a display device that displays screens;
- a change request accepting unit that upon a manipulation of the operation procedure, accepts a change request to change an operation result of a first operation, wherein the first operation has been executed prior to a current execution-permitted operation which is permitted to execute in accordance with the operation procedure, and the operation state table shows that the first operation is completed;
- an operation extracting unit that extracts a second operation under execution with referring to the operation state table;
- an operation identifying unit that identifies operations from the first operation to the second operation with reference to the operation procedure table;
- a confirming-rejecting unit that if the change request is accepted, accepts confirmation or rejection of the change request in accordance with manipulations corresponding to the identified operations;
- a presenting unit that if a manipulation corresponding to the identified operations issues a rejection of the change request, presents a selection screen, wherein the selection screen includes a first option for instructing a withdrawal of the change request and a second option for instructing a withdrawal of the application for the operation procedure;
- a controlling unit that, if a manipulation corresponding to the identified operations issues a rejection of the change request in a state that the execution state table shows that the operation procedure is completed, controls the selection screen to not display the second option so as to prevent the withdrawal of the application from being instructed; and
- a notifying unit that, if the change request is accepted, sends a notification of the execution-permitted operation, that the change request is accepted.

* * * * *